US010606489B2

(12) United States Patent
Ward et al.

(10) Patent No.: US 10,606,489 B2
(45) Date of Patent: Mar. 31, 2020

(54) SIDEFILES FOR MANAGEMENT OF DATA WRITTEN VIA A BUS INTERFACE TO A STORAGE CONTROLLER DURING CONSISTENT COPYING OF DATA

(71) Applicant: International Business Machines Corporation, Armonk, NY (US)

(72) Inventors: Matthew J. Ward, Vail, AZ (US); Matthew J. Kalos, Tucson, AZ (US); Joshua J. Crawford, Tucson, AZ (US); Carol S. Mellgren, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 15/868,875

(22) Filed: Jan. 11, 2018

(65) Prior Publication Data
US 2019/0212924 A1     Jul. 11, 2019

(51) Int. Cl.
*G06F 3/06* (2006.01)
*G06F 12/0802* (2016.01)
*G06F 13/42* (2006.01)

(52) U.S. Cl.
CPC ............ *G06F 3/0619* (2013.01); *G06F 3/065* (2013.01); *G06F 3/0665* (2013.01); *G06F 3/0685* (2013.01); *G06F 12/0802* (2013.01); *G06F 13/4234* (2013.01); *G06F 2212/60* (2013.01)

(58) Field of Classification Search
CPC ...... G06F 3/0619; G06F 3/065; G06F 3/0665; G06F 3/0685; G06F 12/0802; G06F 13/4234; G06F 2212/60
See application file for complete search history.

(56) References Cited

U.S. PATENT DOCUMENTS

| 6,044,444 | A | 3/2000 | Ofek |
| 6,173,377 | B1 | 1/2001 | Yanai et al. |
| 7,941,501 | B2 | 5/2011 | McCabe et al. |
| 8,589,513 | B1 | 11/2013 | Tamer et al. |
| 2009/0070528 | A1* | 3/2009 | Bartfai ................ G06F 11/2082 711/114 |

(Continued)

FOREIGN PATENT DOCUMENTS

| EP | 2793131 A1 | 10/2014 |
| EP | 3155527 A1 | 4/2017 |
| WO | WO2009085326 A1 | 7/2009 |

OTHER PUBLICATIONS

Ji et al., "Seneca: Remote Mirroring Done Write" dated 2003, USENIX Annual Technical Conference, General Track, Total 16 pages.

*Primary Examiner* — Aracelis Ruiz
(74) *Attorney, Agent, or Firm* — Rabindranath Dutta; Konrad, Raynes, Davda and Victor LLP

(57) ABSTRACT

Remote copy operations are performed to copy data from a primary storage controller to a secondary storage controller, wherein input/output (I/O) requests are received at the primary storage controller from a host both via a bus interface and a network interface while the remote copy operations are in progress, and wherein consistency groups are formed during the remote copy operations to copy the data consistently. A relocation is performed of data written via the bus interface for a current consistency group from a cache to a sidefile, and subsequently data written via the bus interface for a next consistency group is stored in the cache.

18 Claims, 13 Drawing Sheets

(56) References Cited

U.S. PATENT DOCUMENTS

2009/0249116 A1* 10/2009 Bartfai ............... G06F 11/2066
                                                          711/162
2017/0097903 A1*  4/2017 Craddock ............. G06F 3/0659

* cited by examiner

SIDEFILES FOR MANAGEMENT OF DATA WRITTEN VIA A BUS INTERFACE TO A STORAGE CONTROLLER DURING CONSISTENT COPYING OF DATA

BACKGROUND

1. Field

Embodiments relate to sidefiles for the management of data written via a bus interface to a storage controller during consistent copying of data

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

In many systems, data may be copied from one storage controller to another storage controller and such copying of data may be referred to as remote copy. The storage controller from which data is copied may be referred to a as a primary storage controller and the storage controller which data is copied may be referred to as a secondary storage controller. One or more storage volumes may be copied from the primary storage controller to the secondary storage controller, where a storage volume may include a plurality of tracks. The copying may comprise mirroring of storage volumes between the primary storage controller and the secondary storage controller for data replication.

Dependent write means that the start of one write operation is dependent upon the completion of a previous write to a storage volume. Dependent writes are the basis for providing consistent data. Providing consistent data means that the order of dependent writes is maintained during data replication. With a consistent copy of data stored in a secondary storage controller, it is possible to quickly recover from a data loss at the primary storage controller.

Certain mirroring mechanisms may control the formation of consistency groups for generating consistency copies of data. A consistency group is a collection of volumes across multiple storage units that are managed together when creating consistent copies of data. The order of dependent writes is preserved in consistency groups. The formation of these consistency groups may be controlled by a primary storage controller which sends commands over remote copy processes and copy volumes to the secondary storage controller.

An out of synchronization (OOS) bitmap identifies which tracks involved in a remote copy relationship have not yet been copied over and are thus protected tracks. Each track is represented by one bit in the bitmap. A bit is set when the corresponding track is to be copied. The bit is reset (i.e., unset) when the corresponding track has been copied from the primary storage controller to the secondary storage controller.

When consistent copies are to be performed between the primary storage controller and the secondary storage controller, a Change Recording (CR) bitmap may be maintained. The CR bitmap has a bit for every track on the source storage volume. When there is a write on a track of the source storage volume after the remote copy relationship has been established for a current consistency group, then a bit is set in the CR bitmap to indicate that the track needs to be copied in the subsequent remote copy for the next consistency group.

SUMMARY OF THE PREFERRED EMBODIMENTS

Provided are a method, system, and computer program product in which remote copy operations are performed to copy data from a primary storage controller to a secondary storage controller, wherein input/output (I/O) requests are received at the primary storage controller from a host both via a bus interface and a network interface while the remote copy operations are in progress, and wherein consistency groups are formed during the remote copy operations to copy the data consistently. A relocation is performed of data written via the bus interface for a current consistency group from a cache to a sidefile, and subsequently data written via the bus interface for a next consistency group is stored in the cache.

In certain embodiments, the remote copy operations are performed by a global mirror process, wherein writes via the bus interface are performed by a syncio process. In response to the global mirror process determining that formation of a new consistency group is to be initiated, the global mirror process transmits identification of a set of volumes that are in the new consistency group to the syncio process. In response to receiving, by the global mirror process from the syncio process, identification of tracks in the set of volumes that the syncio process has reserved for writing, data in the identified tracks is copied to the sidefile.

In further embodiments, in response to completion of copying of the data in the identified tracks to the sidefile, an indication is transmitted to the syncio process to perform queued writes to the cache.

In yet further embodiments, the sidefile is discarded subsequent to completion of draining of an out of synchronization bitmap to complete copying of the current consistency group to the secondary storage controller.

In certain embodiments, the sidefile is an area of memory not included in the cache, wherein using the sidefile prevents a copying of inconsistent data in a global mirror session.

In further embodiments, a syncio process is used to perform writes via the bus interface, wherein the syncio process allows the host to hold an application thread in a spin loop waiting for a write operation to complete, and wherein the syncio process performs reservation of tracks for performing writes for a greater duration of time prior to performing the writes on the tracks in comparison to other processes that perform writes on the tracks via the network interface.

In yet further embodiments, a first data structure stores identification of tracks to be copied for the current consistency group, and a second data structure stores identification of tracks to be copied for the next consistency group.

BRIEF DESCRIPTION OF THE DRAWINGS

Referring now to the drawings in which like reference numbers represent corresponding parts throughout.

DETAILED DESCRIPTION

Figure 1:
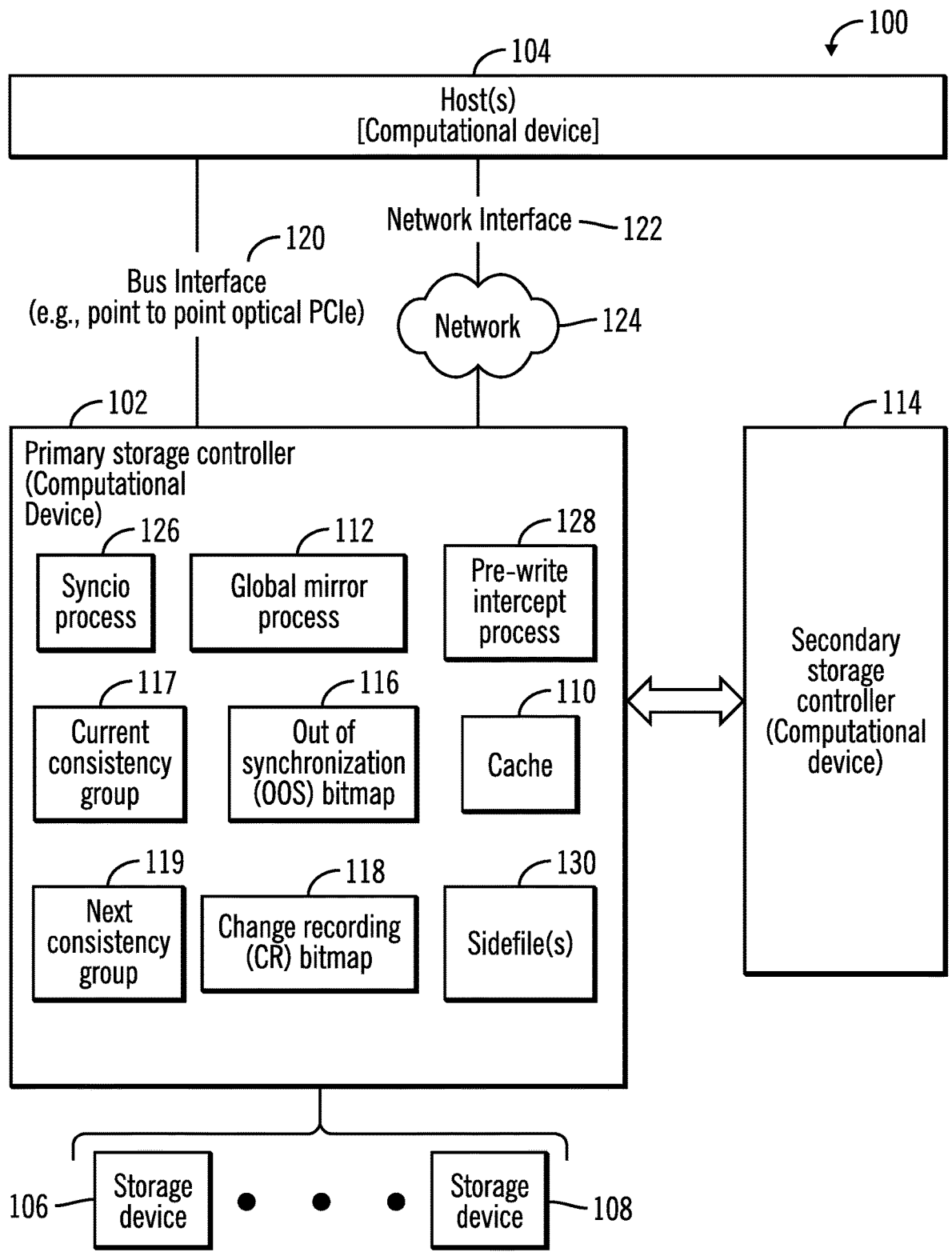
FIG. 1 illustrates a block diagram of a computing environment comprising a primary storage controller coupled to one or more hosts and one or more storage devices, where syncio based writes occur from the one or more hosts to the primary storage controller while a global mirror process is performing operations, in accordance with certain embodiments.

In the following description, reference is made to the accompanying drawings which form a part hereof and which illustrate several embodiments. It is understood that other embodiments may be utilized and structural and operational changes may be made.

Syncio (also referred to as sync I/O) comprises an attachment hardware and protocol for computational devices. Syncio is designed for very low latency random reads and small block sequential writes. Syncio connections between computational devices may be over point to point optical Peripheral Component Interconnect Express (PCIe) interfaces. Syncio operations behave differently than traditional I/O in that in syncio a host computational device may hold an application thread in a spin loop while waiting for the I/O operation to complete. This avoids the need for processor cycles to perform the two context swaps of traditional I/O, the need to perform operations for putting the I/O thread to sleep and then re-dispatching the I/O thread, and the need for an I/O interrupt. Syncio operations may be performed by a syncio process and may correspond to a high speed data transfer process from a host to a primary storage controller.

Due to its strict performance requirements, a syncio process may violate a standard rule of one pre-write intercept call for each write, as is found in previous mechanisms for performing writes in a storage controller. A syncio process may call pre-write intercept once for a track and then write that track multiple times. Pre-write intercept is the mechanism by which a consistent copying mechanism such as global mirror determines which consistency group a write will be in. In global mirror, a consistency group is copied from a primary storage controller to a secondary storage controller, and then once the consistency group is fully copied, the next consistency group is copied. However the consistency group may change in global mirror while syncio is writing a track many times and the syncio is unaware of the change in the consistency group. This can cause inconsistencies in data when dependent writes are placed in an earlier consistency group. There are many other situations in which data may not be copied consistently in the presence of syncio, in existing global mirror mechanisms.

Since it is not possible to rely on the existing pre-write intercept mechanism for determining which writes are part of which consistency group in the presence of an operational syncio process, certain embodiments provide mechanisms in which the change of consistency group is not allowed to cause the syncio process from generating inconsistent data for copying. A sidefile that comprises an area of memory outside of a cache is used to store data of a current consistency group while the syncio process writes data corresponding to a next consistency group to the cache for a very short period of time during which the consistency group is being changed. This allows syncio to perform in parallel with global mirror and still maintain data consistency.

Exemplary Embodiments

FIG. 1 illustrates a block diagram of a computing environment 100 comprising a primary storage controller 102 coupled to one or more hosts 104 and one or more storage devices 106, 108, where syncio based writes occur from the one or more hosts 104 to the primary storage controller 102 while a global mirror process is performing operations, in accordance with certain embodiments.

The primary storage controller 102 allows the one or more hosts 104 to perform input/output (I/O) operations with logical storage maintained by the primary storage controller 102. The physical storage corresponding to the logical storage may be found in one or more of the storage devices 106, 108 and/or a cache 110 of the primary storage controller 102.

A global mirror process 112 that executes in the primary storage controller 102 may perform copy operations to copy tracks of storage volumes from the primary storage controller 102 to a secondary storage controller 114 in a consistent manner. In other words, consistent copies of data are generated while replicating data from the primary storage controller 102 to the secondary storage controller 114. The global mirror process 112 may be referred to as performing asynchronous remote copy operations, i.e., asynchronous copy operations to copy tracks of storage volumes from one storage controller to another storage controller. In certain embodiments the global mirror process 112 may be implemented in software, firmware, hardware or any combination thereof. In existing mechanisms without syncio processes, the global mirror process 112 copies data consistently from the primary storage controller 102 to the secondary storage controller 114.

The global mirror process 112 uses an out of synchronization (OOS) bitmap 116 that indicates tracks to be copied from the primary storage controller 102 to the secondary storage controller 114 in a current consistency group. Each bit of the OOS bitmap 116 corresponds to a track of a storage volume. If a bit is set (i.e., is assigned to 1) then the corresponding track is to be copied from the primary storage controller 102 to the secondary storage controller 114. If a bit is not set (i.e., unset or reset and is assigned to 0) then the corresponding track does not have to be copied from the primary storage controller 102 to the secondary storage controller 114 for data synchronization.

To perform the consistent copying of data in addition to the OOS bitmap 116 a change recording (CR) bitmap 118 is maintained in the primary storage controller 102. In existing mechanisms, the CR bitmap 118 indicates the tracks to be copied for the next consistency group 119. In existing mechanisms, when new writes on tracks are received when the current consistency group 117 is being copied by using the OOS bitmap 116, then bits corresponding to these tracks are set in the CR bitmap 118 as these tracks will be in the next consistency group to be copied over to the secondary storage controller 114. When the current consistency group 117 is copied over, then the CR bitmap 118 is switched into the OOS bitmap 116 for copying the next consistency group 119 that was being stored in the CR bitmap 118.

The primary storage controller 102, the secondary storage controller 114, and the one or more hosts 104 may comprise any suitable computational device including those presently known in the art, such as, a personal computer, a workstation, a server, a mainframe, a hand held computer, a palm top computer, a telephony device, a network appliance, a blade computer, a processing device, a controller, etc. The primary storage controller 102, the secondary storage controller 114 and the one or more hosts 104 may be elements in any suitable network, such as, a storage area network, a wide area network, the Internet, an intranet. In certain embodiments, primary storage controller 102, the secondary storage controller 114, and the one or more hosts 104 may be elements in a cloud computing environment.

In certain embodiments, a host 104 may be coupled to the primary storage controller 102 via a bus interface [e.g., a point to point optical Peripheral Component Interconnect Express (PCIe) interface] 120 and a network interface 122. Syncio operations from the host 104 may be performed over the bus interface 120. Traditional I/O operations from the host 104 may be performed over the network interface 122. The bus interface 120 may comprise a faster access channel for I/O than the network interface 122. Additional bus interface technology to extend the bus interface 120 may be utilized, including PCIe extender cables or components, such as a distributed PCIe switch, to allow PCIe over Ethernet, such as with the ExpEther technology. The network interface 122 may couple the host 104 via a network adapter to a network 124 that includes the primary storage controller 102.

The primary storage controller 102 include a syncio process 126 that allows the performing of syncio based writes from the hosts 104 to the primary storage controller 102. In certain embodiments the syncio process 126 may be implemented in software, firmware, hardware or any combination thereof.

In certain embodiments, a pre-write intercept process 128 implemented in software, firmware, hardware or any combination thereof executes in the primary storage controller 102. For performing a write to a track, processes call the pre-write intercept process 128 and then write to the track. When the pre-write intercept process 128 is called by a process, the consistency group of the global mirror process 112 is determined for writing and the track is reserved for the process.

Processes other than the syncio process 126 call the pre-write intercept process 128 and then quickly write to the track only once and then the track is released. However, the syncio process 126 may call the pre-write intercept process 128 well in advance of the first write by the syncio process 126 to the track. Furthermore, after calling the pre-write intercept process 128, the syncio process 126 may perform multiple writes to the track. Therefore, the syncio process may reserve a track for a considerable amount of time without writing to the track or may reserve a track for a considerable amount of time by performing multiple writes to the track. Thus, the syncio process 126 may reserve a track in anticipation of writing to the track but not actually write to the track immediately after reserving the track.

In certain embodiments, the primary storage controller 102 stores in one or more sidefiles 130 the data of the current consistency group written to a track while data of the next consistency group is being written by the syncio process 126 in the track in the cache 110, while a consistency group is being formed by the global mirror process 112. Each of the sidefiles 130 may comprise areas of memory not located in the cache 110.

Therefore, FIG. 1 illustrates certain embodiments in which the global mirror process 112 performs remote copying of data to the secondary storage controller 114 without generating inconsistent data, even if a syncio process 126 executes in the primary storage controller 102.

Figure 2:
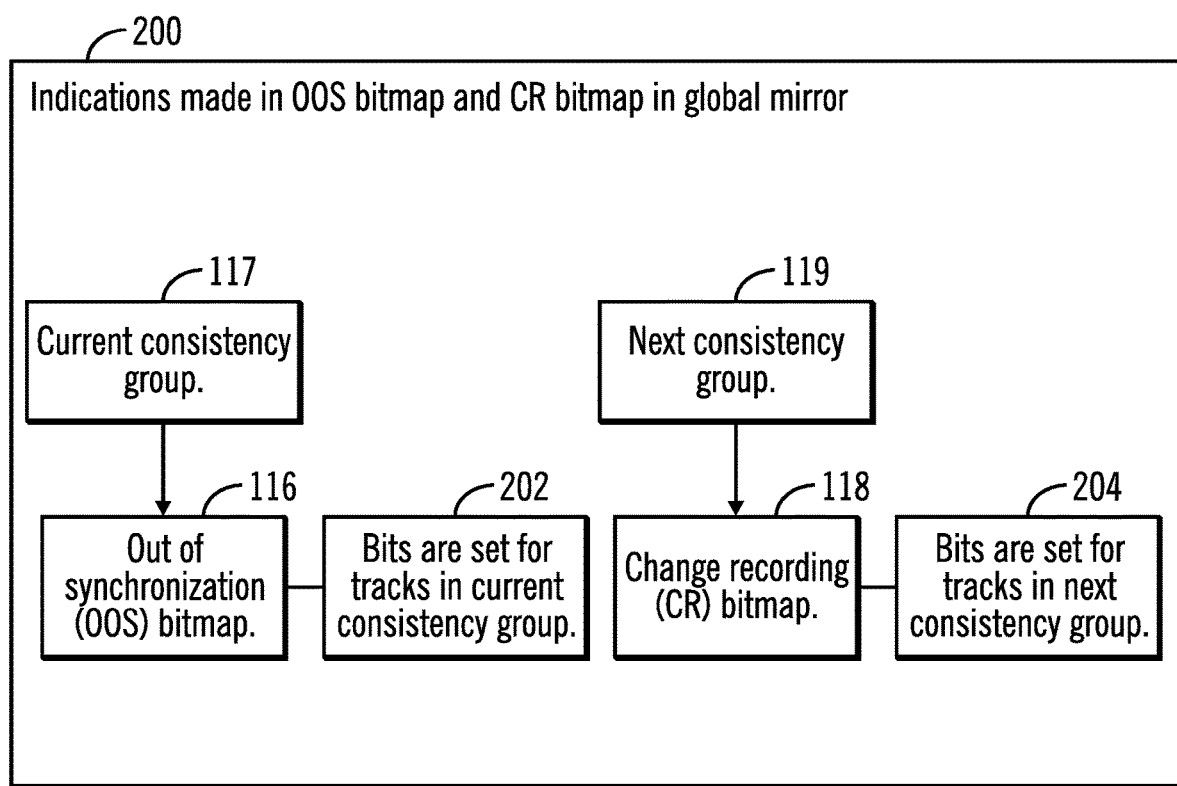
FIG. 2 illustrates a block diagram that shows indications made in an out of synchronization (OOS) bitmap and a change recording (CR) bitmap during a global mirror, in accordance with certain embodiments.

FIG. 2 illustrates a block diagram 200 that shows indications made in an out of synchronization (OOS) bitmap 116 and a change recording (CR) bitmap 118 during a global mirror, in accordance with certain embodiments.

The global mirror process 112 sets bits corresponding to tracks in the current consistency group 117 in the OOS bitmap 116 (as shown via reference numeral 202). The global mirror process 112 sets bits corresponding to tracks in the next consistency group 119 in the CR bitmap 118 (as shown via reference numeral 204).

When the global mirror process 112 completes the copying of the tracks in the current consistency group 117 to the secondary storage controller 114, then the next consistency group 119 becomes the current consistency group for the copying of data. During the time which the consistency group is changed, certain embodiments relocate the data of a current consistency group from the cache 110 to the sidefile 130, and allow syncio processes 126 to write data corresponding to a next consistency group to the cache 110.

Figure 3:
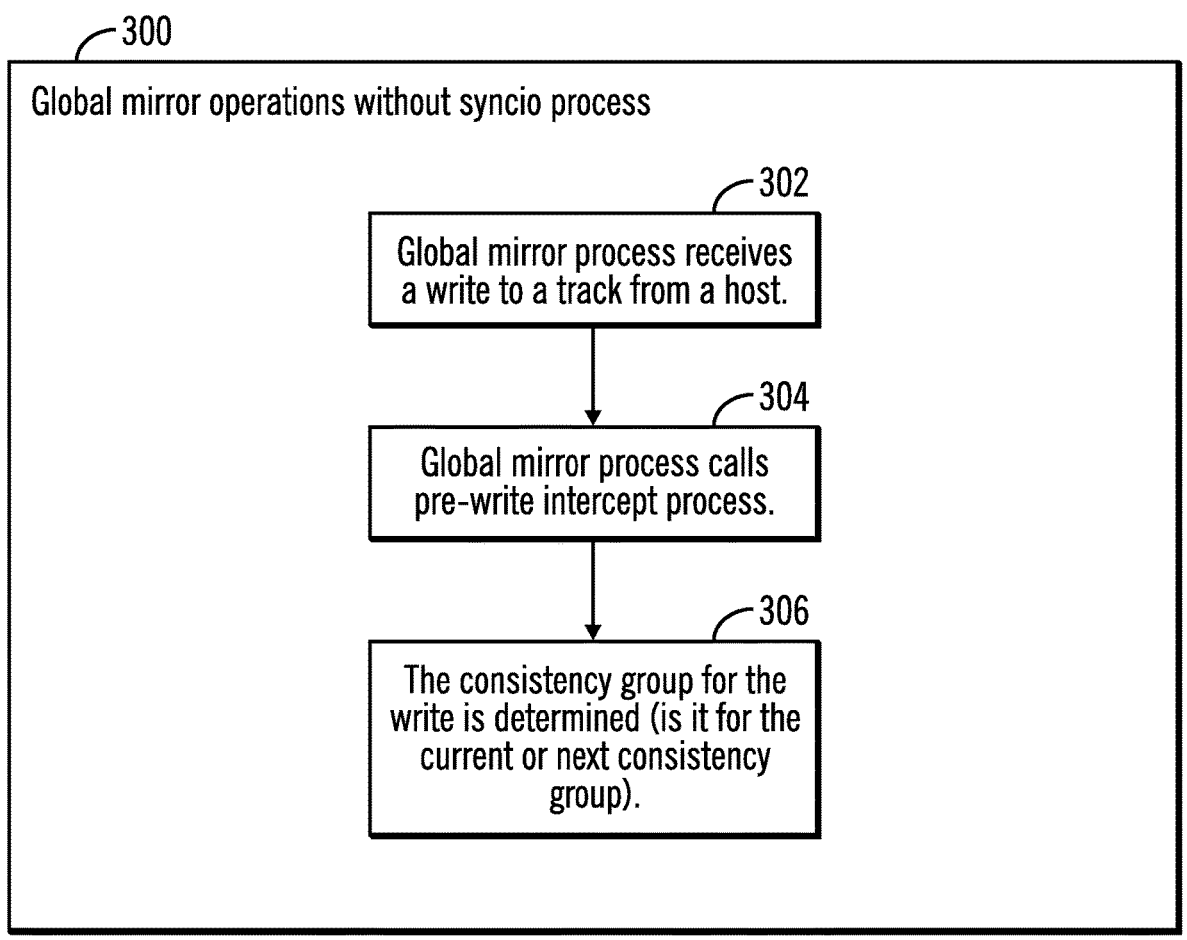
FIG. 3 illustrates a flowchart that shows global mirror operations when there is no operational syncio process, in accordance with certain embodiments.

FIG. 3 illustrates a flowchart 300 that shows global mirror operations when there is no operational syncio process, in accordance with certain embodiments.

Control starts at block 302 in which the global mirror process 112 receives a write operation to write to a track from a host 104. Control proceeds to block 304 in which the global mirror process calls the pre-write intercept process 128. On calling the pre-write intercept process 128, a determination is made (at block 306) of the consistency group for the write.

Therefore, FIG. 3 illustrates that on calling the pre-write intercept process 128 the consistency group for the write is determined.

Figure 4:
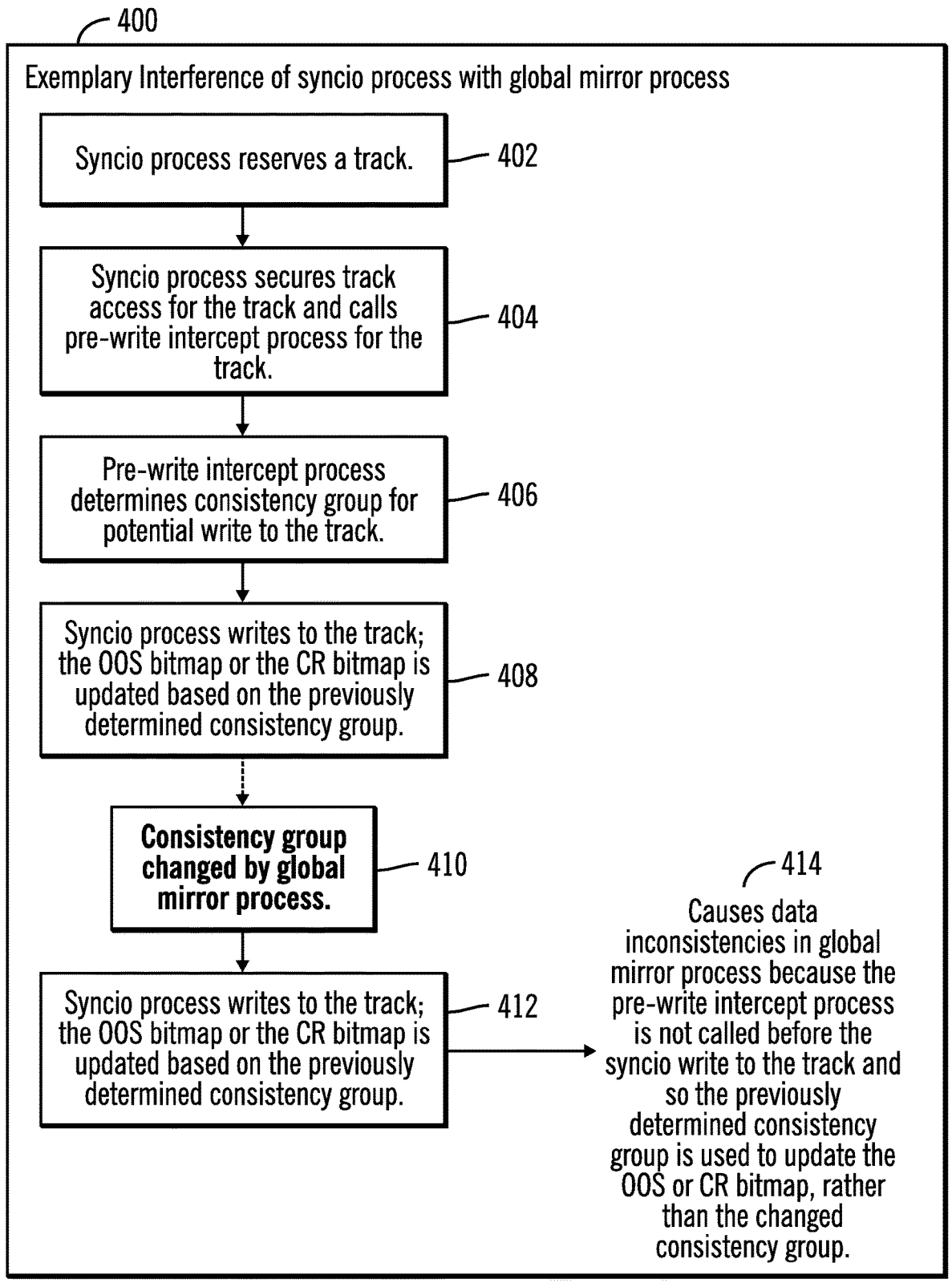
FIG. 4 illustrates a flowchart that shows an exemplary interference of a syncio process with a global mirror process to generate inconsistent data, in accordance with certain embodiments.

FIG. 4 illustrates a flowchart 400 that shows an exemplary interference of a syncio process with a global mirror process to generate inconsistent data, in accordance with certain embodiments.

Control starts at block 402 in which a syncio process 126 reserves a track. The syncio process 126 secures track access for the track and calls (at block 404) the pre-write intercept process 128 for the track. The pre-write intercept process 128 determines (at block 406) the consistency group for potential write to the track.

From block 406 control proceeds to block 408 in which the syncio process 126 writes to the track, and the OOS bitmap 116 or the CR bitmap 118 is updated based on the previously determined consistency group. However, before another write by the syncio process 126 the current consistency group is changed by the global mirror process 112 (at block 410). In existing mechanisms, if the syncio process 126 now writes (at block 412) to the track, then the OOS bitmap 116 or the CR bitmap 118 is updated based on the previously determined consistency group. As a result data inconsistencies are caused in the global mirror process 112 because the pre-write intercept process 128 is not called before the write to the track and the previously determined consistency group is used to update the OOS or CR bitmap rather than the changed consistency group (as shown via reference numeral 414).

Figure 5:
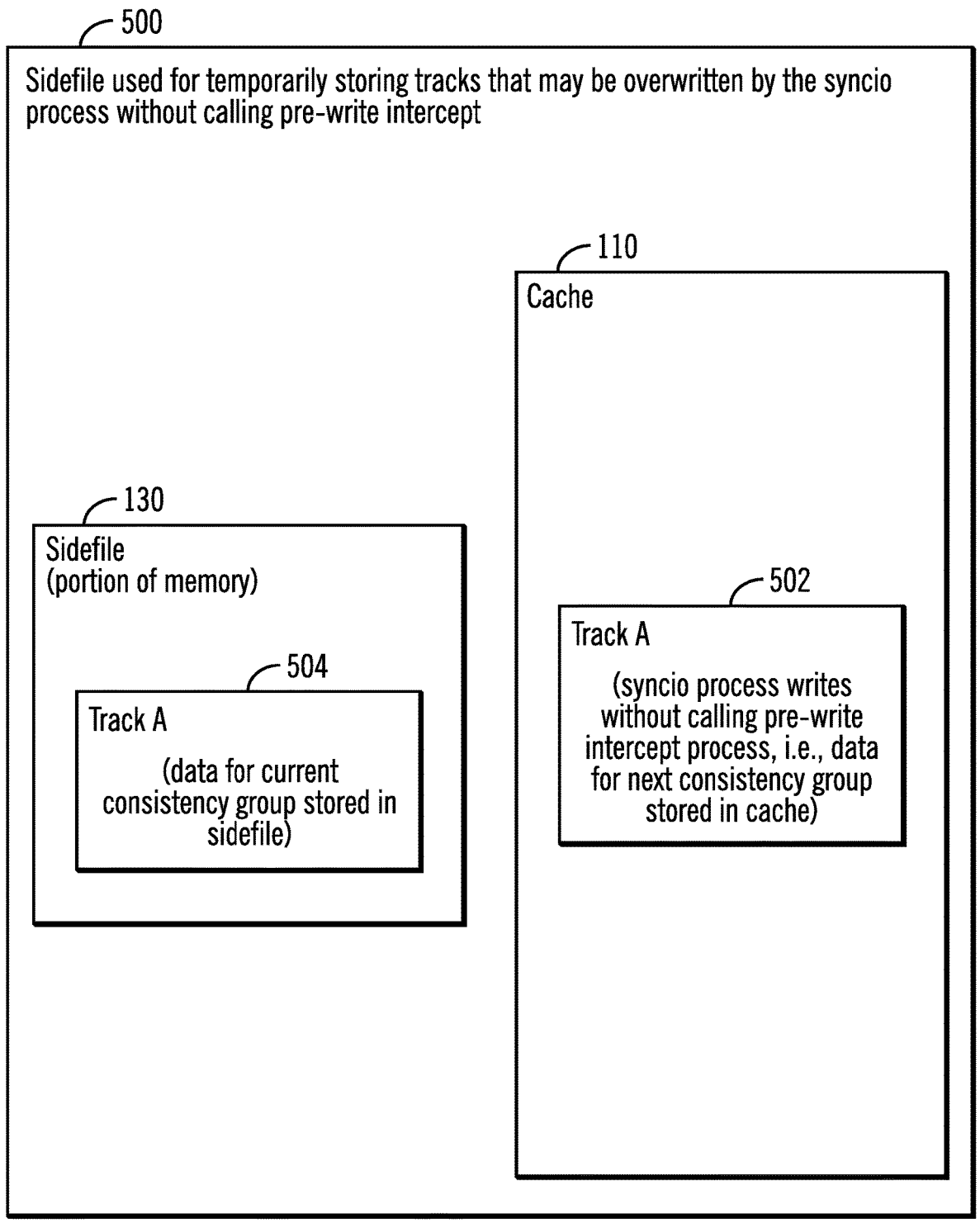
FIG. 5 illustrates a block diagram that shows how a sidefile is used for temporarily storing data for tracks that may be overwritten by the syncio process without calling a pre-write intercept process, in accordance with certain embodiments.

FIG. 5 illustrates a block diagram 500 that shows how a sidefile 130 is used for temporarily storing data for tracks that may be overwritten by the syncio process 126 without calling a pre-write intercept process 128, in accordance with certain embodiments. The operations shown in FIG. 5 may be performed in the primary storage controller 102.

FIG. 5 shows track A being stored in the cache 110. In response to initiation of formation of a consistency group, track A is copied to the sidefile 130 (shown via reference numeral 504). Thus track A 504 stored in the sidefile 130 stores data for the current consistency group. During the time in which the consistency group is being formed, the syncio process 126 may write to track A 502 in the cache, i.e. data for the next consistency group is stored in the cache 110. The first write of a syncio process 126 after calling the pre-write intercept process 128 may be written in the cache 110 and then relocated to the sidefile 130 as the first write may belong to the current consistency group. A subsequent write of the syncio process 126 (without calling the pre-write intercept process 128) belongs to the next consistency group and is written in the cache 110.

Figure 6:
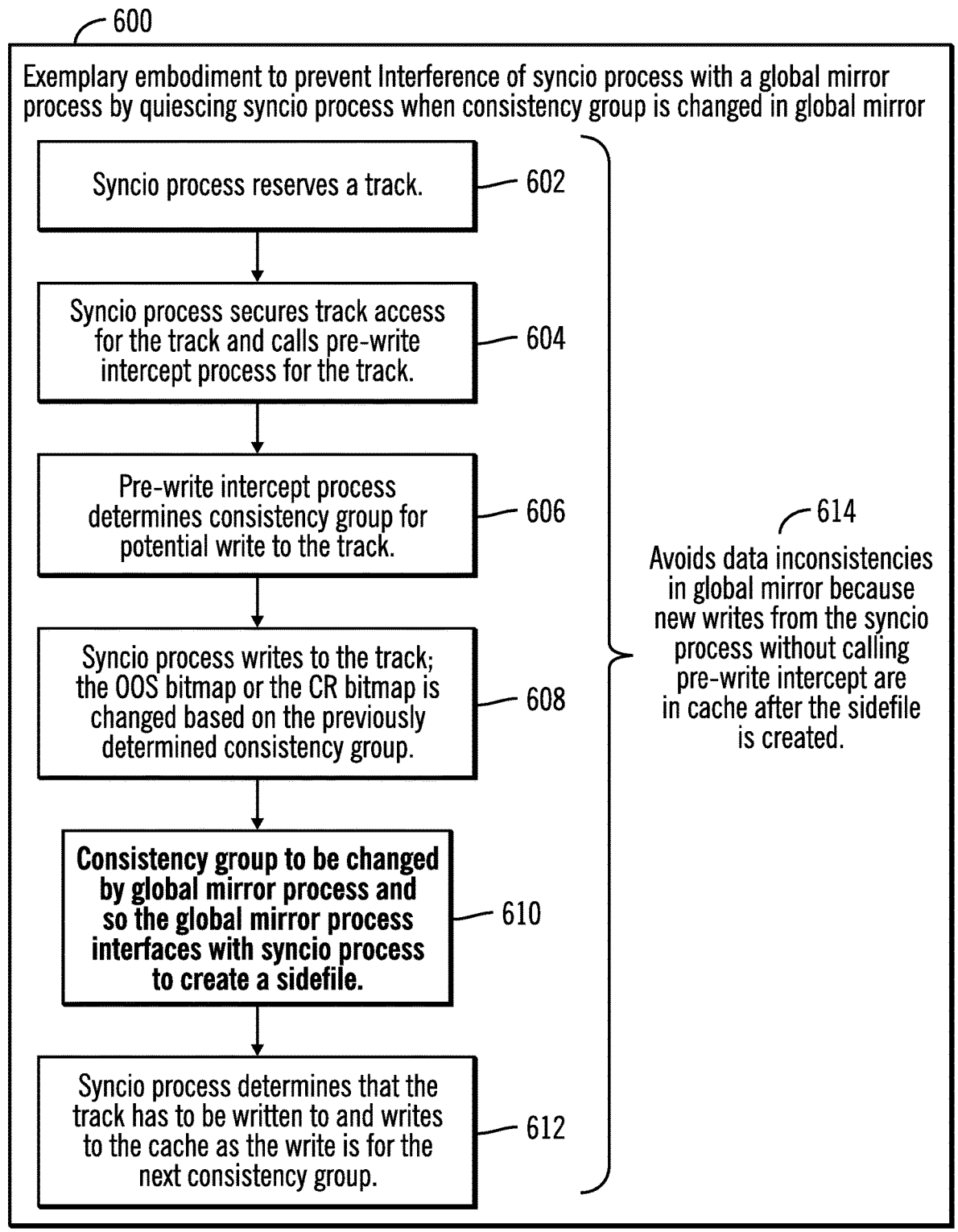
FIG. 6 illustrates a flowchart that shows an exemplary mechanism to prevent interference of a syncio process with a global mirror process by relocating data of the current consistency group to a sidefile, in accordance with certain embodiments.

FIG. 6 illustrates a flowchart 600 that shows an exemplary mechanism to prevent interference of a syncio process with a global mirror process by relocating data of the current consistency group to a sidefile, in accordance with certain embodiments. The operations shown in FIG. 6 may be performed in the primary storage controller 102.

Control starts at block 602 in which a syncio process 126 reserves a track. The syncio process 126 secures track access for the track and calls (at block 604) the pre-write intercept process 128 for the track. The pre-write intercept process 128 determines (at block 606) the consistency group for potential write to the track.

From block 606 control proceeds to block 608 in which the syncio process 126 writes to the track, and the OOS bitmap 116 or the CR bitmap 118 is updated based on the previously determined consistency group. However, before another write by the syncio process 126, the current consistency group is changed by the global mirror process 112 (at block 610). In certain embodiments as shown via reference numeral 610, while changing the current consistency group the global mirror process 112 also interfaces with the syncio process 126 to create the sidefile 130 for storage of writes belonging to the current consistency group for a track, while writes of the next consistency group for the track are stored in the cache 110.

As a result when the quiesced syncio process 126 determines at block 612 that a new write has be performed on the track, the write is for the next consistency group and is stored in the cache 110.

Therefore, FIG. 6 illustrates certain embodiments that avoids data inconsistencies in global mirror because new writes from the syncio process 126 without calling pre-write intercept process 128 are in cache 110 after the sidefile 130 is created (as shown via reference numeral 614).

Figure 7:
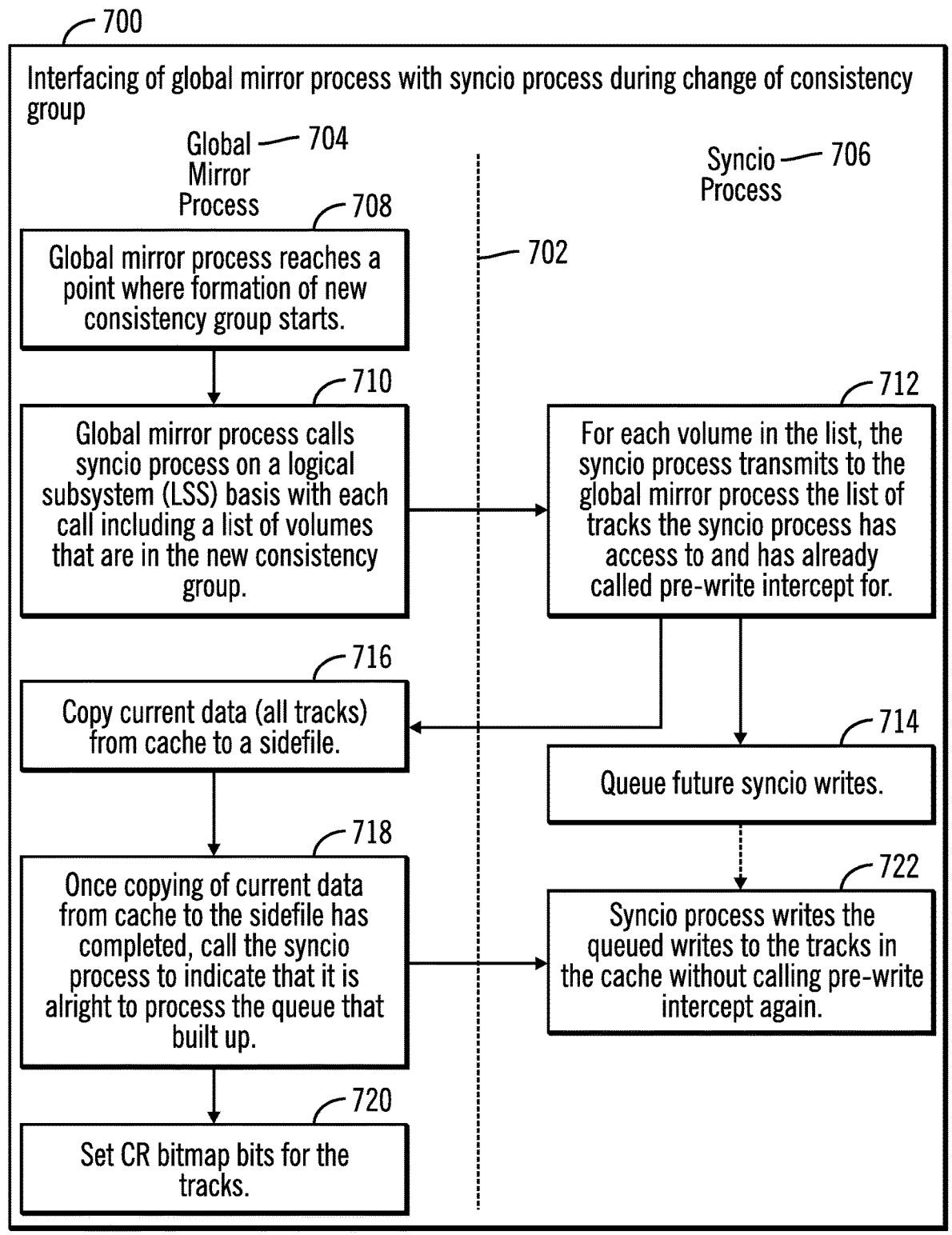
FIG. 7 illustrates a flowchart that shows the interfacing of the global mirror process with the syncio process during change of consistency group, in accordance with certain embodiments.

FIG. 7 illustrates a flowchart 700 that shows the interfacing of the global mirror process 112 with the syncio process 126 during change of consistency group, in accordance with certain embodiments. The operations shown in FIG. 7 may be performed in the primary storage controller 102. The operations to the left of the dashed line 702 are performed by the global mirror process 112 (as shown via reference numeral 704). The operations to the right of the dashed line 702 are performed by the syncio process 126 (as shown via reference numeral 706).

Control starts at block 708 in which the global mirror process 112 reaches a point where it is ready to start a new consistency group, and the global mirror process 112 identifies any I/O prior to this point as being in the current consistency group, and any syncio write after this point are to be assigned to the next consistency group. Without support for syncio, I/Os come through the pre-write intercept process 128 so that is where the I/Os are assigned to current or next consistency group. However if syncio is supported in the primary storage controller 102, the syncio writes may occur without going through the pre-write intercept process. To support syncio while maintaining data consistency the embodiments shown in FIG. 7 introduce a communication between the global mirror process 112 and the syncio process 126.

When the global mirror process 112 reaches the point where formation of a new consistency group starts, the global mirror process 112 calls (at block 710) the syncio process 126 on a logical storage subsystem (LSS) basis with each call containing a list of volumes that is in the new consistency group. The syncio process 126 takes this list of volumes and return to the global mirror process 112 the list of tracks it currently has access to and for which it has already called the pre-write intercept process 128 (at block 712). The syncio process 126 then writes syncio writes (at block 714) and this may not violate the performance requirements of syncio if the global mirror process 112 can complete the formation of the new consistency group quickly enough. To maximize performance enough sidefiles are allocated to copy current data of all tracks from the cache 110 to the sidefiles 130 when the global mirror process 112 receives the list of tracks from the syncio process 126 (at block 716).

Once all tracks are copied to sidefiles, the global mirror process 112 calls the syncio process 126 to indicate that it is now alright to process the queue that built up (at block 718). Since the global mirror process 112 attempts to minimize the time the syncio process 126 has to wait, the global mirror process 112 waits to set the CR bitmap 118 for all the tracks (at block 720) until after the global mirror process 112 has notified the syncio process 126 that the syncio process 126 can process the queued writes.

The syncio process 126 writes the queued writes to the tracks in the cache 110 without calling the pre-write intercept process 128 again, and these writes are for the next consistency group (at block 722).

Figure 8:
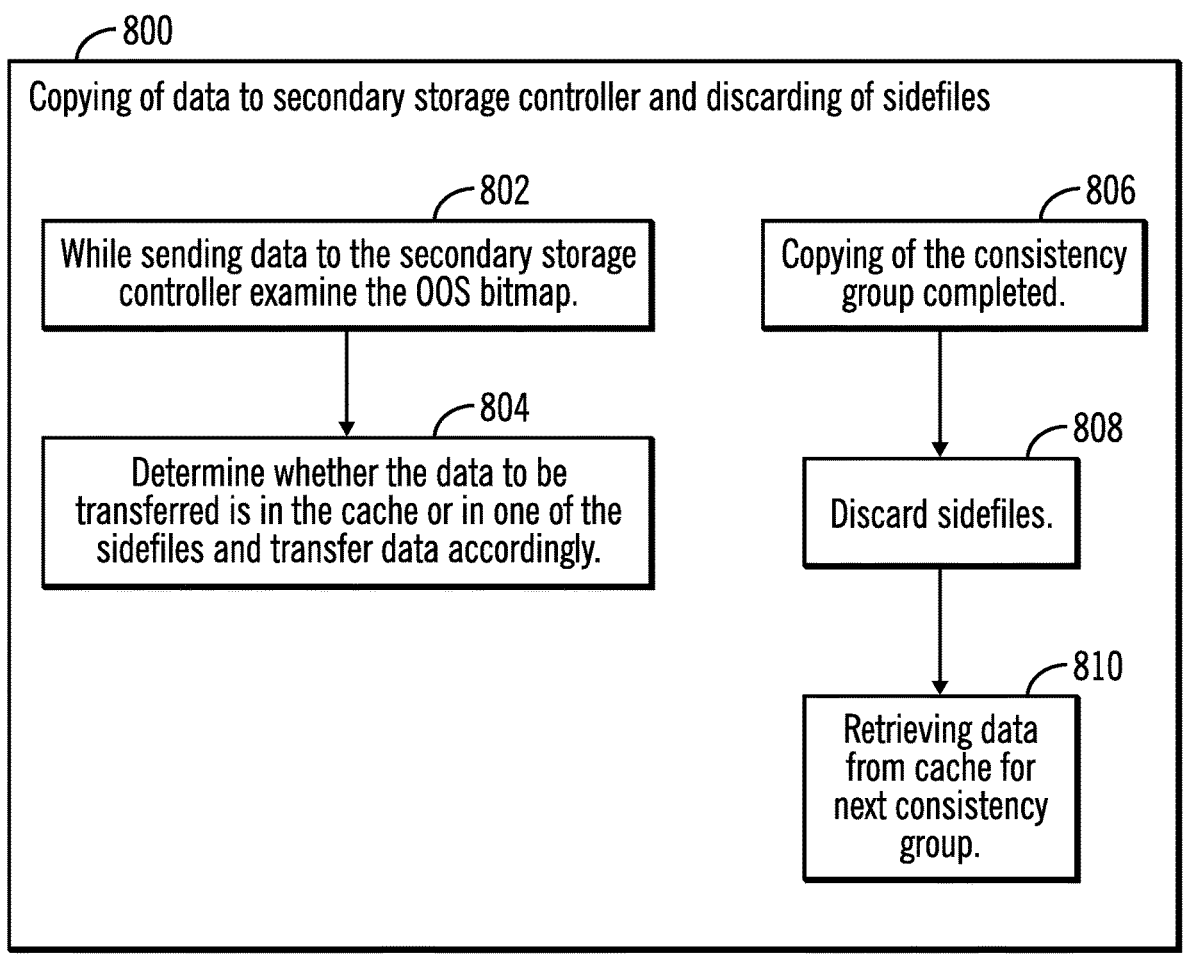
FIG. 8 illustrates flowcharts that show the copying of data to the secondary storage controller and the discarding of sidefiles, in accordance with certain embodiments.

FIG. 8 illustrates a flowchart 800 that shows the copying of data to the secondary storage controller 114 and the discarding of sidefiles 130, in accordance with certain embodiments. The operations shown in FIG. 8 may be performed in the primary storage controller 102.

When a process that is responsible for sending data to the secondary storage controller 114 processes the set bits of the OOS bitmap 116, the process checks a new indicator that indicates whether the data to be transferred is in cache 110 or is in one of these new sidefiles 130 (as shown via reference numerals 802 and 804). The new indicator may be stored in the primary storage controller 102.

When copying of the current consistency group is completed, the sidefiles 130 created for this purpose can be discarded, and for the next consistency group data is retrieved from the cache 110 (as shown via reference numeral 806, 808, 810).

Figure 9:
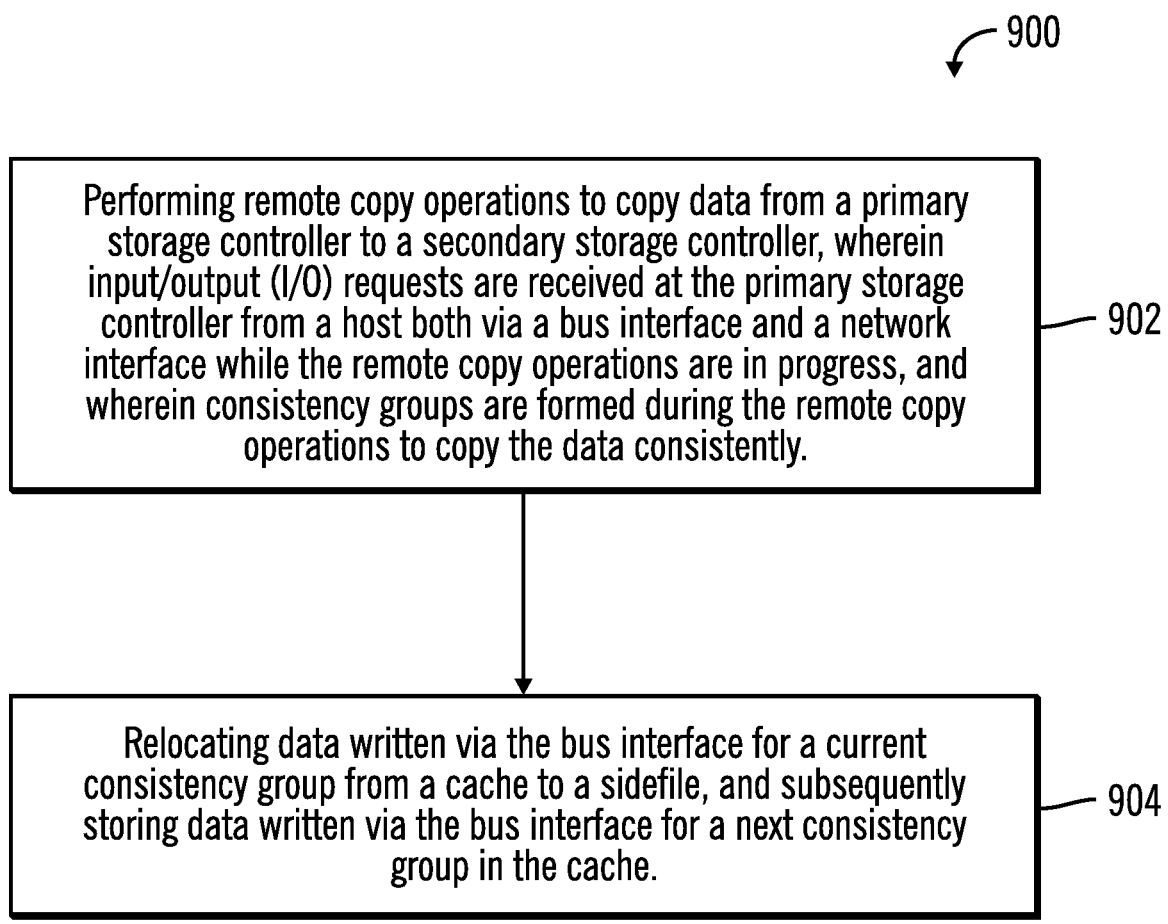
FIG. 9 illustrates a flowchart that shows how to integrate syncio with global mirror by relocating data of a current consistency group to a sidefile, in accordance with certain embodiments.

FIG. 9 illustrates a flowchart 900 that shows how to integrate syncio with global mirror by relocating data of a current consistency group to a sidefile 130, in accordance with certain embodiments. The operations shown in FIG. 9 may be performed in the primary storage controller 102.

Control starts at block 902 in which remote copy operations are performed to copy data from a primary storage controller 102 to a secondary storage controller 114, wherein input/output (I/O) requests are received at the primary storage controller 102 from a host 104 both via a bus interface 120 and a network interface 122 while the remote copy operations are in progress, and wherein consistency groups are formed during the remote copy operations to copy the data consistently. A relocation is performed (at block 904) of data written via the bus interface 120 for a current consistency group from a cache 110 to a sidefile 130, and subsequently data written via the bus interface 120 for a next consistency group is stored in the cache 110.

Figure 10:
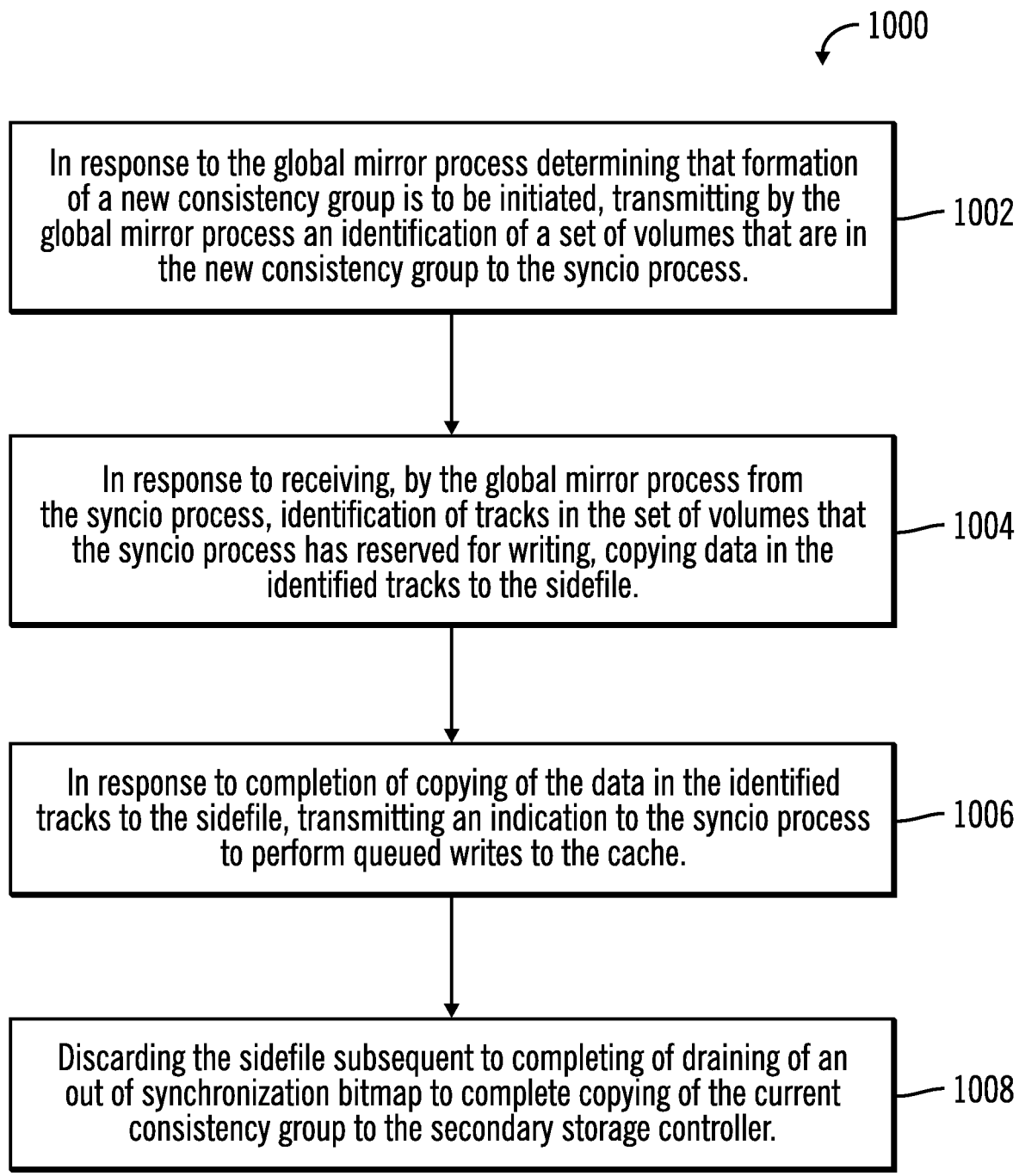
FIG. 10 illustrates a flowchart that shows how to integrate syncio with global mirror without generating inconsistent copies of data, in accordance with certain embodiments.

FIG. 10 illustrates a flowchart 1000 that shows how to integrate syncio with global mirror without generating inconsistent copies of data, in accordance with certain embodiments. The operations shown in FIG. 10 may be performed in the primary storage controller 102.

Control starts at block 1002 in which in response to the global mirror process 112 determining that formation of a new consistency group is to be initiated, the global mirror process 112 transmits identification of a set of volumes that are in the new consistency group to the syncio process 126. In response to receiving, by the global mirror process 112 from the syncio process 126, identification of tracks in the set of volumes that the syncio process has reserved for writing, data in the identified tracks is copied to the sidefile 130 (at block 1004).

In further embodiments, in response to completion of copying of the data in the identified tracks to the sidefile 130, an indication is transmitted to the syncio process 126 to perform queued writes to the cache 110 (at block 1006). From block 1006 control proceeds to block 1008 in which the sidefile 130 is discarded subsequent to completion of draining of an out of synchronization bitmap 116 to complete copying of the current consistency group to the secondary storage controller 114.

As a result of embodiments shown in FIGS. 1-10, existing mechanisms for global mirror are integrated with syncio without generating inconsistent copies of data.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 11:
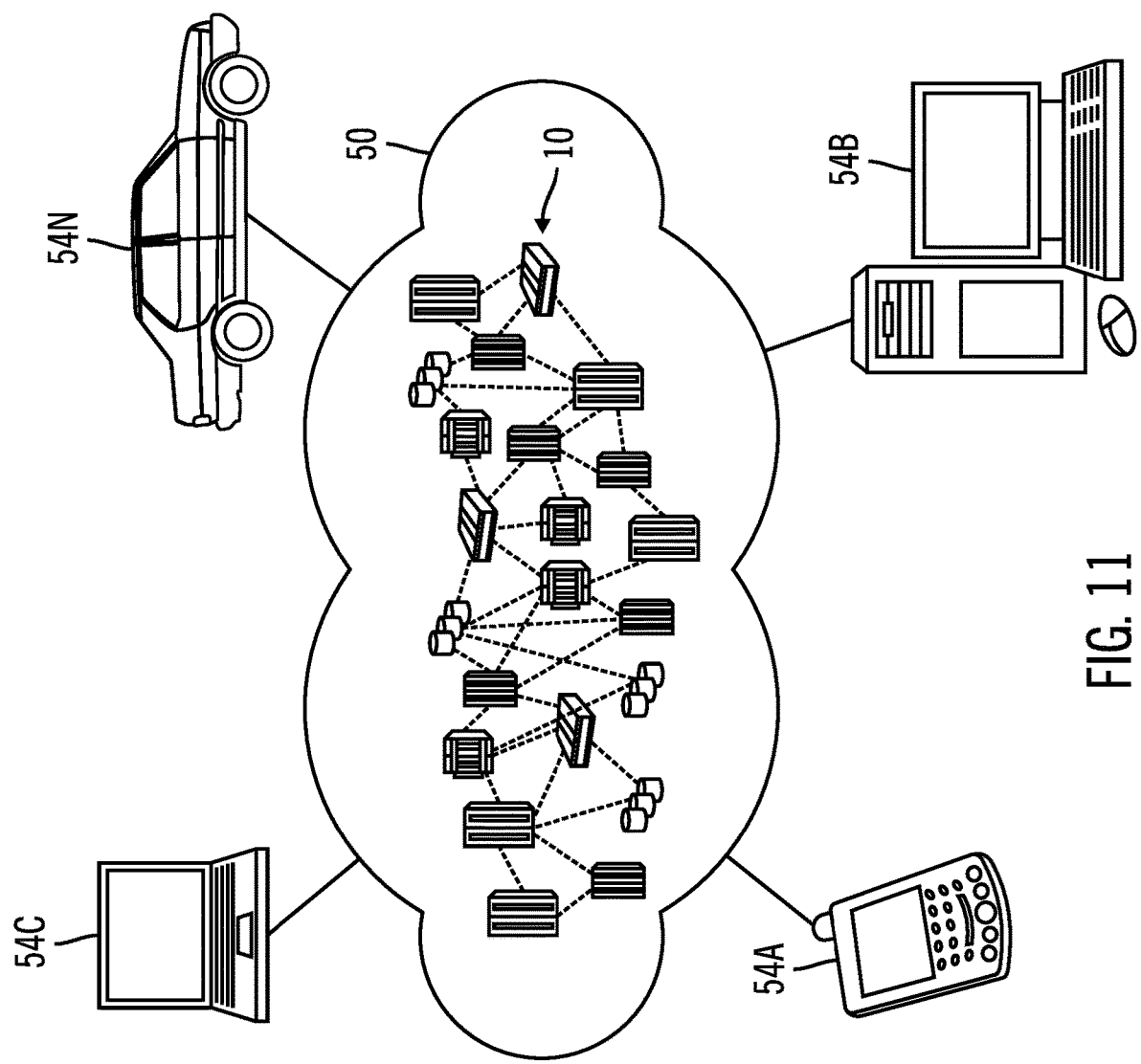
FIG. 11 illustrates a block diagram of a cloud computing environment, in accordance with certain embodiments.

Referring now to FIG. 11 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
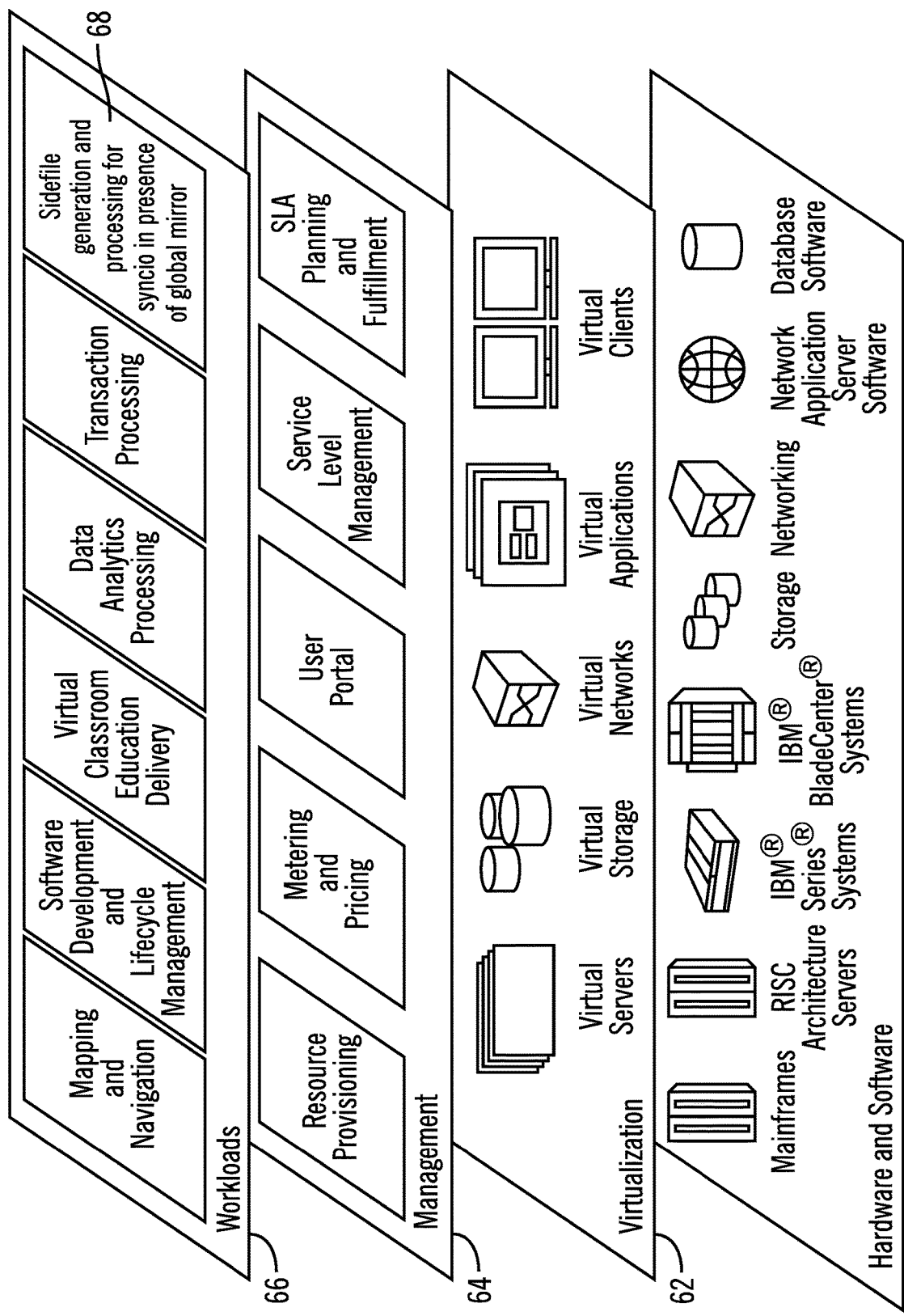
FIG. 12 illustrates a block diagram of further details of the cloud computing environment of FIG. 11, in accordance with certain embodiments.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

*IBM, zSeries, pSeries, xSeries, BladeCenter, WebSphere and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and sidefile generation and processing for syncio in presence of global mirror 68 as shown in FIGS. 1-12.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 13:
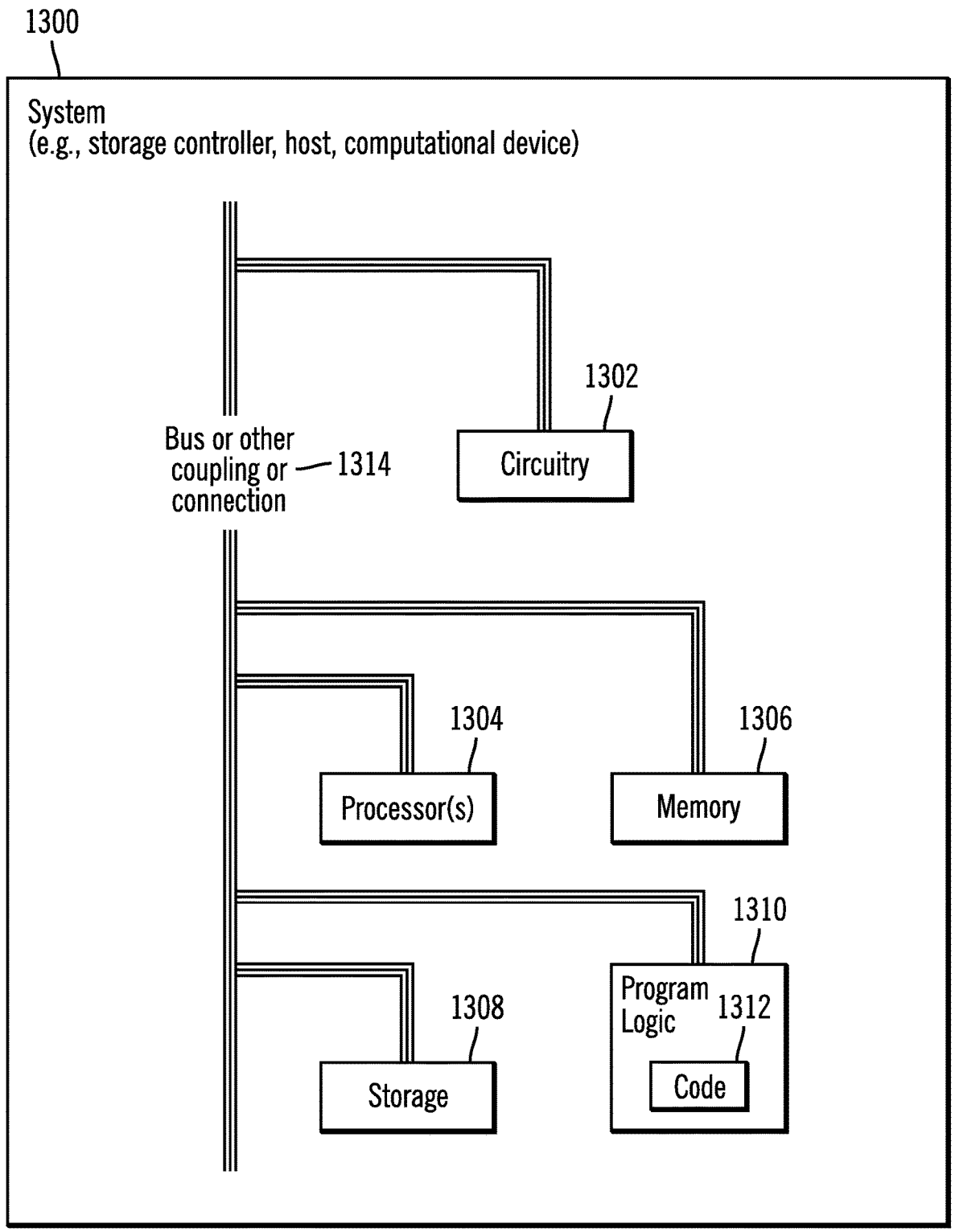
FIG. 13 illustrates a block diagram of a computational system that shows certain elements that may be included in the storage controllers or the host, as described in FIGS. 1-12, in accordance with certain embodiments.

FIG. 13 illustrates a block diagram that shows certain elements that may be included in the primary storage controller 102, the secondary storage controller 114, the hosts 104, or other computational devices in accordance with certain embodiments. The system 1300 may include a circuitry 1302 that may in certain embodiments include at least a processor 1304. The system 1300 may also include a memory 1306 (e.g., a volatile memory device), and storage 1308. The storage 1308 may include a non-volatile memory device (e.g., EEPROM, ROM, PROM, flash, firmware, programmable logic, etc.), magnetic disk drive, optical disk drive, tape drive, etc. The storage 1308 may comprise an internal storage device, an attached storage device and/or a network accessible storage device. The system 1300 may include a program logic 1310 including code 1312 that may be loaded into the memory 1306 and executed by the processor 1304 or circuitry 1302. In certain embodiments, the program logic 1310 including code 1312 may be stored in the storage 1308. In certain other embodiments, the program logic 1310 may be implemented in the circuitry 1302. One or more of the components in the system 1300 may communicate via a bus or via other coupling or connection 1314. Therefore, while FIG. 13 shows the program logic 1310 separately from the other elements, the program logic 1310 may be implemented in the memory 1306 and/or the circuitry 1302.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   performing remote copy operations, by a global mirror process, to copy data from a primary storage controller to a secondary storage controller, wherein input/output (I/O) requests are received at the primary storage controller from a host both via a bus interface and a network interface while the remote copy operations are in progress, wherein writes via the bus interface are performed by a syncio process, and wherein consistency groups are formed during the remote copy operations to copy the data consistently;
relocating data written via the bus interface for a current consistency group from a cache to a sidefile, and subsequently storing data written via the bus interface for a next consistency group in the cache; and
in response to the global mirror process determining that formation of a new consistency group is to be initiated, transmitting by the global mirror process an identification of a set of volumes that are in the new consistency group to the syncio process; and
in response to receiving, by the global mirror process from the syncio process, identification of tracks in the set of volumes that the syncio process has reserved for writing, copying data in the identified tracks to the sidefile.

2. The method of claim 1, the method further comprising:
in response to completion of copying of the data in the identified tracks to the sidefile, transmitting an indication to the syncio process to perform queued writes to the cache.

3. The method of claim 2, the method further comprising:
discarding the sidefile subsequent to completion of draining of an out of synchronization bitmap to complete copying of the current consistency group to the secondary storage controller.

4. The method of claim 3, wherein the sidefile is an area of memory not included in the cache, and wherein using the sidefile prevents a copying of inconsistent data in a global mirror session.

5. The method of claim 1, wherein a syncio process is used to perform writes via the bus interface, wherein the syncio process allows the host to hold an application thread in a spin loop waiting for a write operation to complete, and wherein the syncio process performs reservation of tracks for performing writes for a greater duration of time prior to performing the writes on the tracks in comparison to other processes that perform writes on the tracks via the network interface.

6. The method of claim 1, the method further comprising:
storing in a first data structure identification of tracks to be copied for the current consistency group; and
storing in a second data structure identification of tracks to be copied for the next consistency group.

7. A system, comprising:
a memory; and
a processor coupled to the memory, wherein the processor performs operations, the operations comprising:
performing remote copy operations, by a global mirror process, to copy data from a primary storage controller to a secondary storage controller, wherein input/output (I/O) requests are received at the primary storage controller from a host both via a bus interface and a network interface while the remote copy operations are in progress, wherein writes via the bus interface are performed by a syncio process, and wherein consistency groups are formed during the remote copy operations to copy the data consistently;
relocating data written via the bus interface for a current consistency group from a cache to a sidefile, and subsequently storing data written via the bus interface for a next consistency group in the cache; and
in response to the global mirror process determining that formation of a new consistency group is to be initiated, transmitting by the global mirror process an identification of a set of volumes that are in the new consistency group to the syncio process; and
in response to receiving, by the global mirror process from the syncio process, identification of tracks in the set of volumes that the syncio process has reserved for writing, copying data in the identified tracks to the sidefile.

8. The system of claim 7, the operations further comprising:
in response to completion of copying of the data in the identified tracks to the sidefile, transmitting an indication to the syncio process to perform queued writes to the cache.

9. The system of claim 8, the operations further comprising:
discarding the sidefile subsequent to completion of draining of an out of synchronization bitmap to complete copying of the current consistency group to the secondary storage controller.

10. The system of claim 9, wherein the sidefile is an area of memory not included in the cache, and wherein using the sidefile prevents a copying of inconsistent data in a global mirror session.

11. The system of claim 7, wherein a syncio process is used to perform writes via the bus interface, wherein the syncio process allows the host to hold an application thread in a spin loop waiting for a write operation to complete, and wherein the syncio process performs reservation of tracks for performing writes for a greater duration of time prior to performing the writes on the tracks in comparison to other processes that perform writes on the tracks via the network interface.

12. The system of claim 7, the operations further comprising:
storing in a first data structure identification of tracks to be copied for the current consistency group; and
storing in a second data structure identification of tracks to be copied for the next consistency group.

13. A computer program product, the computer program product comprising a computer readable storage medium having computer readable program code embodied therewith, the computer readable program code configured to perform operations, the operations comprising:
performing remote copy operations, by a global mirror process, to copy data from a primary storage controller to a secondary storage controller, wherein input/output (I/O) requests are received at the primary storage controller from a host both via a bus interface and a network interface while the remote copy operations are in progress, wherein writes via the bus interface are performed by a syncio process, and wherein consistency groups are formed during the remote copy operations to copy the data consistently;
relocating data written via the bus interface for a current consistency group from a cache to a sidefile, and subsequently storing data written via the bus interface for a next consistency group in the cache; and
in response to the global mirror process determining that formation of a new consistency group is to be initiated, transmitting by the global mirror process an identification of a set of volumes that are in the new consistency group to the syncio process; and
in response to receiving, by the global mirror process from the syncio process, identification of tracks in the set of volumes that the syncio process has reserved for writing, copying data in the identified tracks to the sidefile.

14. The computer program product of claim 13, the operations further comprising:

in response to completion of copying of the data in the identified tracks to the sidefile, transmitting an indication to the syncio process to perform queued writes to the cache.

15. The computer program product of claim 14, the operations further comprising:

discarding the sidefile subsequent to completion of draining of an out of synchronization bitmap to complete copying of the current consistency group to the secondary storage controller.

16. The computer program product of claim 15, wherein the sidefile is an area of memory not included in the cache, and wherein using the sidefile prevents a copying of inconsistent data in a global mirror session.

17. The computer program product of claim 13, wherein a syncio process is used to perform writes via the bus interface, wherein the syncio process allows the host to hold an application thread in a spin loop waiting for a write operation to complete, and wherein the syncio process performs reservation of tracks for performing writes for a greater duration of time prior to performing the writes on the tracks in comparison to other processes that perform writes on the tracks via the network interface.

18. The computer program product of claim 13, the operations further comprising:

storing in a first data structure identification of tracks to be copied for the current consistency group; and storing in a second data structure identification of tracks to be copied for the next consistency group.

\* \* \* \* \*